May 5, 1953　　　L. H. THORESEN ET AL　　　2,637,310
FLUID PROPORTIONING AND CONDITIONING APPARATUS
Filed Nov. 7, 1950　　　　　　　　　　3 Sheets-Sheet 1
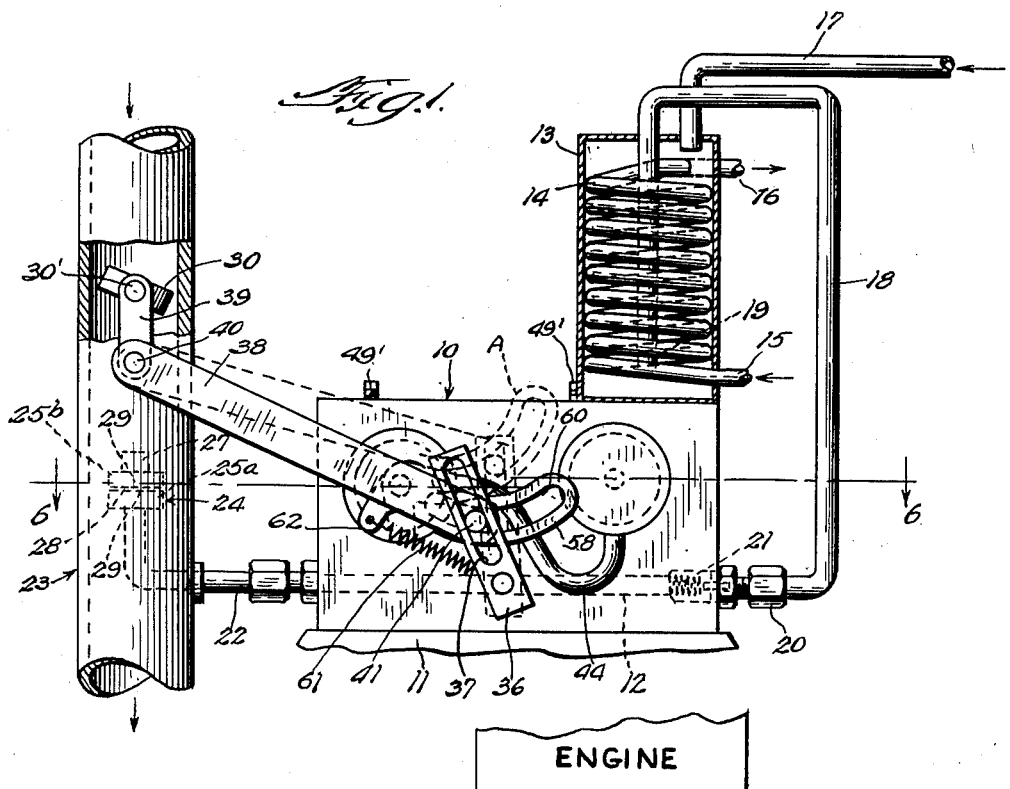
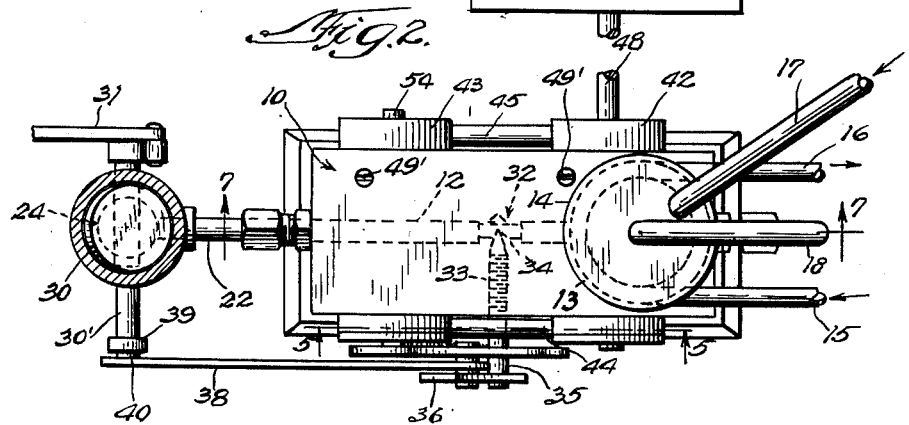
INVENTORS
Lorntz H. Thoresen &
Henry L. Thoresen May 5, 1953 L. H. THORESEN ET AL 2,637,310
FLUID PROPORTIONING AND CONDITIONING APPARATUS
Filed Nov. 7, 1950 3 Sheets-Sheet 2
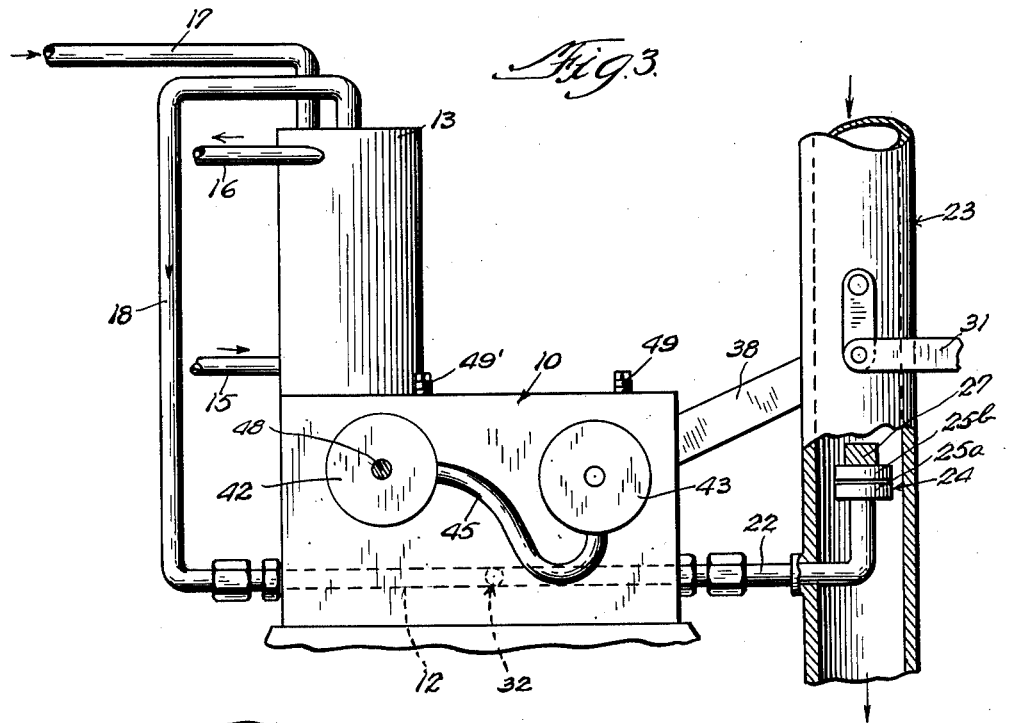
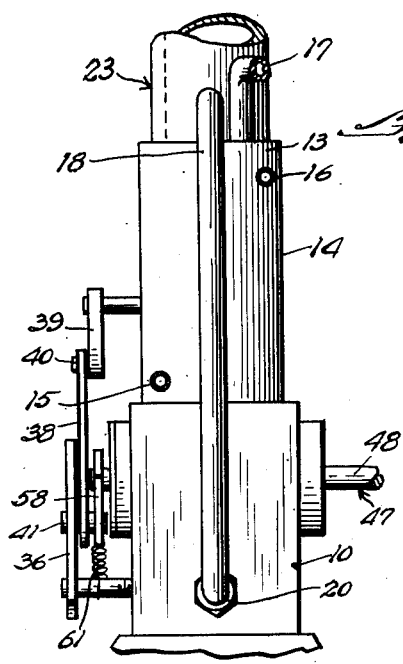
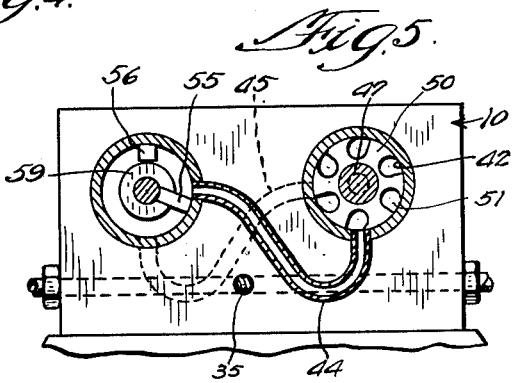
INVENTORS.
Lorentz H. Thoresen
& Henry L. Thoresen.

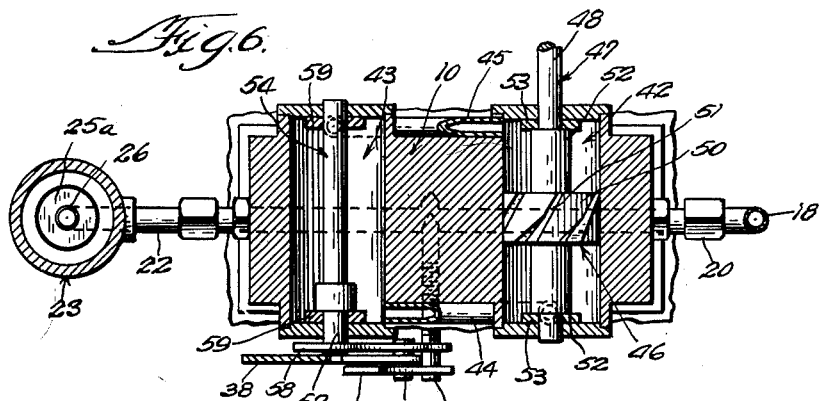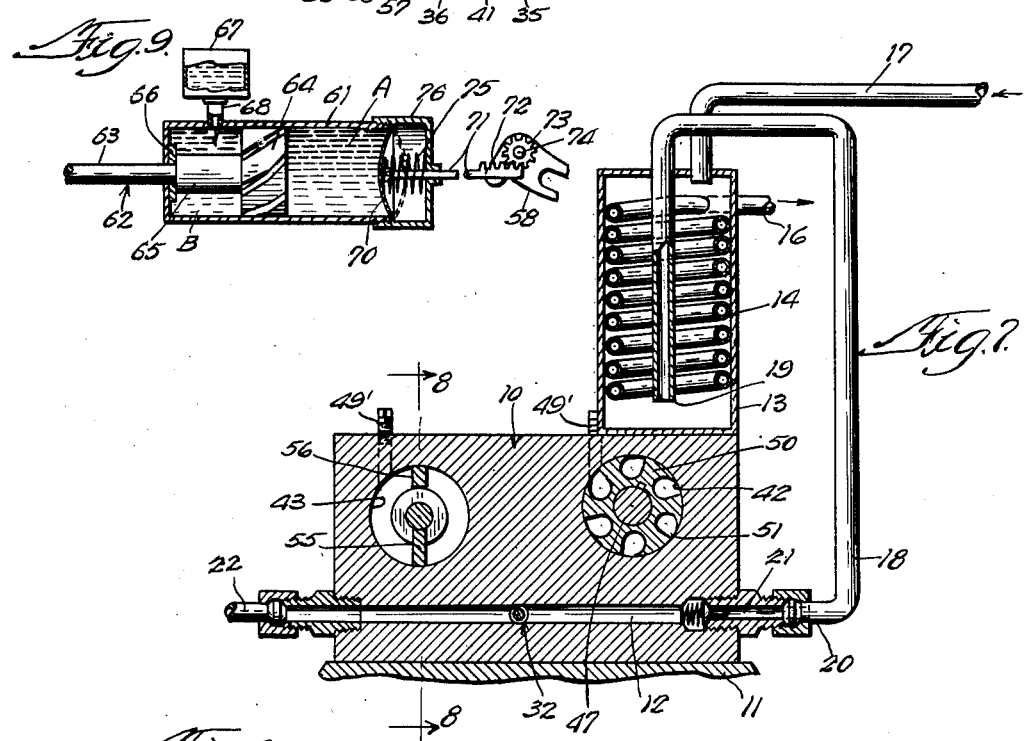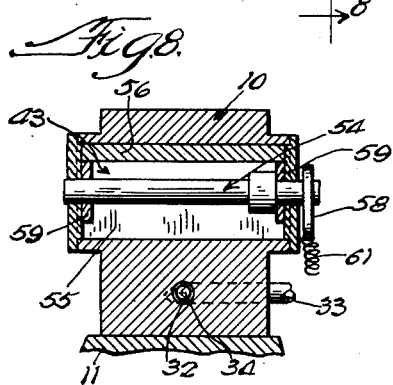

Patented May 5, 1953

2,637,310

UNITED STATES PATENT OFFICE 2,637,310

FLUID PROPORTIONING AND CONDITIONING APPARATUS

Lorntz H. Thoresen and Henry L. Thoresen, Chicago, Ill.

Application November 7, 1950, Serial No. 194,556

9 Claims. (Cl. 123—123)

This invention relates to an apparatus for use in proportioning and conditioning various mixable fluids so as to obtain a mixture of said fluids having desired qualities which will be automatically maintained even though the mixture is subjected to varying conditions.

In automobile engines, for example, difficulty is frequently encountered in maintaining the proper fuel-air ratio of the combustible mixture under all operating conditions of the engine. Such difficulty in part is due to the nonuniform physical properties of the fuel and also to the fact that the amount of fuel, which is withdrawn from the bowl of a conventional carburetor by suction and discharged into the intake manifold of the engine, is not in direct proportion to the amount of air drawn through the air intake pipe under various operating speeds of the engine. With the conventional carburetor the proper or optimum air-fuel ratio of the combustible mixture can only be accurately set for one particular speed of the engine.

A further difficulty is encountered in achieving the desired vaporization of the fuel and uniformity of distribution thereof to all the engine cylinders. This latter difficulty is due primarily to the varying temperature of the fuel and to the inability of the conventional type spray nozzles to cause the liquid fuel to be finely sprayed over a large area into the intake manifold so as to enable the sprayed fuel to be more effectively exposed to the air stream flowing through the intake pipe and combine more readily therewith to form a vaporized fuel.

Thus it is one of the objects of this invention to provide an apparatus which will overcome the above-enumerated difficulties and result in a more efficient and economical operation of the engine.

It is a further object of this invention to provide an apparatus which is simple in construction, effective in operation, and inexpensive to produce.

Further and additional objects will appear from the description, accompanying drawings, and appended claims.

In accordance with one embodiment of this invention, an apparatus is provided for proportioning various mixable fluids to form a mixture of a desired quality. The apparatus comprises a mixing chamber, an imput conduit for one fluid leading to said chamber, and a second imput conduit for a second fluid leading also to said chamber. Disposed within the first conduit is an adjustable metering valve. Disposed within the second conduit is a control valve. The two valves are operatively connected so that the initial setting of the metering valve is dependent upon the setting of the control valve. A compensating unit is provided which is operatively connected to said metering valve to adjust the initial setting of said valve while the setting of the control valve remains unchanged. The operation of the unit is dependent upon the output of said mixing chamber.

For a more complete understanding of the invention reference should be made to the drawings wherein:

Fig. 1 is a fragmentary front elevational view of the apparatus showing the mixing chamber partially cut away to expose one position of the butterfly valve when the engine is being accelerated. A changed position of the metering valve control arm is shown in dotted lines;

Fig. 2 is a top plan view of the apparatus shown in Fig. 1;

Fig. 3 is a fragmentary back elevational view of the apparatus;

Fig. 4 is a right end view of the apparatus shown in Fig. 1;

Fig. 5 is a fragmentary sectional view of the apparatus taken along line 5—5 of Fig. 2; the relative position of the vaned shaft is shown when the engine is idling;

Fig. 6 is a fragmentary sectional view of the apparatus taken along line 6—6 of Fig. 1;

Fig. 7 is a fragmentary sectional view of the apparatus taken along line 7—7 of Fig. 2;

Fig. 8 is a fragmentary sectional view of the apparatus taken along line 8—8 of Fig. 7; and Fig. 9 is a modified form of the fuel compensating mechanism.

Referring now to the drawings and more particularly to Fig. 1 a fuel conditioner and metering apparatus is shown in this instance for use in combination with an internal combustion engine comprising a housing 10 secured by suitable means to any convenient part of the engine 11. Formed within housing 10 and extending the entire length thereof is a narrow, open-end passage 12. Mounted on the upper side of housing 10 is a liquid fuel reservoir 13 having disposed therein a heating coil 14. The lower and upper ends 15 and 16, respectively, of the coil 14 project beyond the reservoir and are connected to the cooling system of the engine. The cooling medium subsequent to its absorbing the heat from the engine, is circulated through coil 14 prior to its being returned to the radiator of the engine, not shown.

Liquid fuel is directed from the fuel pump of the engine, not shown, into reservoir 13 through a fuel line 17. A second line 18 extends from reservoir 13 and has its lower end 20 connected to one end of passage 12. The other end 19 of tube 18 terminates within the lower part of reservoir 13. The fluctuating pressure from the fuel pump, not shown, is equalized within the reservoir by reason of an air cushion occupying the upper portion of the reservoir. An air pressure of approximately three pounds per square inch is created within this air cushion by the fuel pump. The amount of pressure created, however, will depend on the size of the pump and the speed of operation thereof.

The check valve 21, which is positioned at the connection between passage 12 and tube 18, is spring set at a pressure slightly less than that maintained within the reservoir thus preventing flow of the liquid fuel through tube 18 when the fuel pump or engine is inoperative.

Affixed to the other end of passage 12 is a connector tube 22 having the free end thereof terminating within the intake pipe 23 of the engine. Intake pipe 23 communicates with the intake manifold of the engine, not shown. Secured to the terminating end of tube 22 is a discharge spray nozzle 24. Nozzle 24 comprises a pair of disclike members 25a and 25b which are arranged in superimposed relation. Disclike member 25a mounted on the terminating end of tube 22 is provided with an aperture 26 which is concentric with respect to the internal passage of tube 22. The upper disclike member 25b is secured to a brace element 27 which in turn is secured at either end to the interior surface of intake pipe 23 by welding or any other suitable means. The spacing 28 between disclike members 25a and 25b is such that the liquid fuel, when discharged from the nozzle, will adhere to the opposing surfaces 29 of the disclike members and thereby cause the fuel to be sprayed radially in all directions over a wide area. Thus, due to the wide area of spray of the fuel, greater combining of the fuel in the air stream will result.

The air intake into pipe 23 is regulated by a conventional type butterfly valve 30 which is rotatably mounted within the pipe and spaced above discharge nozzle 24. Butterfly valve 30 is connected directly by a link 31 to the accelerator pedal of the engine, not shown, see Fig. 2.

Mounted centrally of housing 10 and disposed within passage 12 is a metering valve 32. Valve 32 is of a needle type and comprises a threaded stud 33 having the inner end 34 thereof tapered and adapted to be restrictively positioned withing passage 12. The stud 33 is disposed at substantially a right angle with respect to passage 12 and has the other end 35 thereof exposed. Keyed to the exposed end 35 is an elongated lever 36 having an elongated, longitudinally extending slot 37 formed therein.

Metering valve 32 and butterfly valve 30 are operatively connected to one another by a pair of links 38 and 39. Link 38 is the longer of the two. The links are pivotally connected to one another at point 40. Mounted on the lower end of link 38 and extending transversely therefrom in both directions is a pin 41. One end of pin 41 is disposed within a slot 37 formed in lever 36. Link 39 is secured at one end to shaft 30' on which is mounted butterfly valve 30.

The initial setting of the stud 33 of metering valve 32, as heretofore mentioned, is determined by the setting of butterfly valve 30 which in turn is determined by the depression of the accelerator pedal. The air enters intake pipe 23 through an air filter, not shown, and combines with the liquid fuel in the vicinity of nozzle 24. The direction of flow of the air in pipe 23 is indicated by the arrows in Fig. 1. Subsequent to the forming of the combustible, vaporized mixture it is directed to the intake manifold of the engine, not shown.

Formed transversely within housing 10 and spaced above passage 12 is a pair of hollow cylinders or cavities 42 and 43 which form a part of a fuel compensating mechanism. The cylinders 42 and 43 are interconnected with each other by means of passages 44 and 45. The cylinders 42 and 43 and the passages 44 and 45 are filled with a common liquid, preferably a medium weight oil. The oil is introduced into cylinders 42 and 43 through ports 49 formed in housing 10. Threaded plugs 49' are provided for capping these ports. Rotatably mounted within cylinder 42 is an impeller 46. The impeller comprises a shaft 47 supported at either end by the housing and has one end 48 thereof projecting beyond housing 10. The exposed end 48 of the shaft is operatively connected to the drive shaft of the engine, thus, the speed of the impeller is directly proportional to the speed of the engine. Keyed to shaft 47 and disposed centrally of cylinder 42 is a wheel 50 having a plurality of angularly disposed grooves 51 formed symmetrically about the periphery thereof. A pair of spacer sleeves are disposed on either side of wheel 50. Disposed intermediate the sleeves and the ends of the cylinder are a pair of sealing gaskets 53. As the wheel 50 is rotated the angular grooves 51 cause the common liquid to circulate consecutively through cylinder 42, passage 44, cylinder 43, passage 45 and back into cylinder 42. The greater the speed of rotation of wheel 50, the greater the pressure transferred by the circulating oil from cylinder 42 to cylinder 43.

Rotatably mounted within cylinder 43 is a shaft 54 supported at either end by the housing 10. Mounted on shaft 54 and extending radially therefrom, is an elongated vane 55. Mounted above shaft 54 and extending radially downwardly from the interior surface of cylinder 43 is an elongated baffle 56. One end 57 of shaft 54 extends beyond housing 10 and has keyed thereto a curved lever 58. Lever 58 has formed therein an arcuate slot 60 which is adapted to receive one end of pin 41 which is mounted on link 38. Lever 58 is biased in a counterclockwise direction by means of a spring 61. One end of spring 61 is secured to a finger portion 62 formed on lever 58 and the other end is secured to the exposed end 35 of stud 33. Shaft 54 is provided with sealing gaskets 59 to prevent leakage of the common liquid about the shaft. As the common liquid is circulated from cylinder 42 into cylinder 43 by the impeller 46, a force is exerted on vane 55 by the circulated liquid causing the shaft 54 to rotate in a clockwise direction. The clockwise movement of shaft 54 causes a clockwise movement of lever 58 which in turn causes lever 36, which is keyed to stud 33 of metering valve 32, to be rotated in a counterclockwise direction from its initial setting, thereby effecting a greater opening of the metering valve. The setting of butterfly valve remains constant while the initial setting of valve 32 is adjusted. The initial setting of metering valve 32 and lever 58 is shown in dotted lines in Fig. 1 and indicated as position A. The adjusted setting of metering valve 32 causes an optimum fuel-to-air ratio of the vaporized mixture to be obtained thereby effecting more efficient operation of the engine at any particular speed. As the speed of the engine is decreased, by the butterfly valve 30 assuming a more horizontal position, lever 58 will return towards position A by reason of spring 60, thereby effecting closing of metering valve 32 and reducing the amount of liquid fuel injected into pipe 23 in proportion to the changed engine speed so as to maintain the optimum fuel-air ratio of the combustible mixture. The shape of slot 60 in lever 58 is dependent upon the calculated optimum fuel-to-air ratios of the mixture over a wide range of engine speeds.

A modified form of fuel compensating mechanism is shown in Fig. 9 comprising a hollow cylindrical unit 61 filled with a suitable liquid and an impeller 62 rotatably mounted within the unit 61. One end portion of the impeller shaft 63 extends through an opening formed in the end of unit 61 and is operatively connected to the drive shaft of the engine. The other end of the impeller shaft terminates within the unit 61 and has keyed thereto an impeller wheel 64. Wheel 64 is of a construction similar to wheel 50 as heretofore described. Upon rotation of the impeller wheel 64 a high pressure is developed in side A of the unit 61 while a low pressure is created in side B. Sufficient clearance is provided between the periphery of the wheel and the interior surface of the unit to effect bleeding of the liquid from side A to side B of the unit, when the speed of rotation of the wheel 64 is decreased. A sleeve 65 and sealing gasket 66 hold wheel 64 in a fixed position within unit 61. A liquid supply 67 is connected by a suitable conduit 68 to side B of the unit and keeps the unit full of liquid at all times. Mounted over the end of the high pressure side of the unit 61 is a diaphragm 70 which is adapted to normally assume a concave position as shown. As the pressure in side A increases the diaphragm 70 is caused to flex as shown in dotted lines. Connected to the exposed side of the diaphragm is a ratchet arm 71 which is adapted to move in a longitudinal direction upon flexing of the diaphragm. Ratchet teeth 72 are formed on the free end of arm 71 and are adapted to mesh with a sprocket 73. The sprocket is keyed to a shaft 74 on which the curved lever 58 is also keyed. The diaphragm is held in its normally concave position by a coil spring 75 which embraces a portion of arm 71. One end of the spring engages the diaphragm 70 and the other end engages a cap 76 which is threaded onto the corresponding end of the unit 61. An opening is provided in the cap through which the ratchet arm 71 extends.

While the apparatus is shown for use in this instance in combination with an internal combustion engine, it is to be understood, of course, that it is not to be limited to such use but may be employed in other instances where, for example, the integration of various movable parts of a machine is of utmost importance.

The advantages obtained through the use of this apparatus in conjunction with an internal combustion engine are, among others; (a) optimum fuel-air ratio for various engine operating speeds thereby minimizing fuel waste; (b) constant physical properties and pressure of the fuel, making more accurate metering thereof possible; (c) constant viscosity and temperature of the liquid fuel thereby making greater vaporization of the fuel possible with consequent equality of distribution of the vaporized fuel to all the engine cylinders and also more efficient and complete combustion of the vaporized fuel; (d) a conical pattern of finely sprayed fuel from the nozzle results causing increased vaporization of the fuel thereby resulting in more rapid and complete combustion thereof.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

We claim:

1. An apparatus for use in proportioning mixable fluids to produce a mixture of desired proportions, comprising a mixing chamber, an imput conduit for one mixable fluid leading to said chamber, an adjustable metering valve disposed within said conduit, a second imput conduit for a second mixable fluid leading to said chamber, an adjustable flow valve disposed within said second conduit, an operative connection between said valves whereby the initial setting of the metering valve is dependent upon the setting of said flow valve, and compensating means in cooperative relation with said metering valve for adjusting the initial setting of said metering valve; said means comprising a hollow unit filled with a common fluid, a pressure developing element for said fluid disposed within said unit, the amount of pressure developed by said element being dependent upon the output from said mixing chamber, and a pressure-responsive member disposed within said unit and operatively connected to said metering valve.

2. An apparatus for use in proportioning mixable fluids to produce a mixture of desired proportions, comprising a mixing chamber, an imput conduit for one mixable fluid leading to said chamber, an adjustable metering valve disposed within said conduit, a second imput conduit for a second mixable fluid leading to said chamber, an adjustable flow valve disposed within said second conduit, an operative connection between said valves whereby the initial setting of the metering valve is dependent upon the setting of said flow valve, and compensating means in cooperative relation with said metering valve for adjusting the initial setting of said metering valve; said means comprising a hollow unit filled with a common fluid, a pressure developing element for said fluid disposed within said unit, the operation of said element being dependent upon the output from said chamber, and a movable member disposed within said unit and operatively connected to said metering valve, the movement of said member being dependent upon the pressure of said fluid.

3. An apparatus for use in proportioning mixable fluids to produce a mixture of desired proportions, comprising a mixing chamber, an imput conduit for one fluid leading into said chamber, an adjustable metering valve disposed within said conduit, a second imput conduit for a second fluid leading into said chamber, a flow valve disposed within said second conduit, an operative connection between said valves whereby the initial setting of the metering valve is dependent upon the setting of the flow valve, and compensating means actuated by the output from said mixing chamber and in cooperative engagement with said metering valve for adjusting the initial setting thereof while the setting of said flow valve remains relatively fixed; said means comprising a pair of interconnected hollow members filled with a common fluid, an impeller disposed within one of said members and motivated by the output from said chamber for effecting pressure to said liquid, a pressure responsive element movably mounted within said other member and operatively connected to said metering valve.

4. An apparatus for use in proportioning mixable fluids to produce a mixture of desired proportions, comprising a mixing chamber, an imput conduit for one fluid leading into said chamber, an adjustable metering valve disposed within said conduit, a second imput conduit for a second fluid leading into said chamber, a flow valve disposed within said second conduit, an operative connection between said valves whereby the initial setting of the metering valve is dependent upon the setting of the flow valve, and compensating means actuated by the output from said mixing chamber and in cooperative engagement with said metering valve for adjusting the initial setting thereof while the setting of said flow valve remains relatively fixed; said means comprising a pair of interconnected hollow cylinders filled with a common fluid, an elongated impeller rotatably mounted within one of said cylinders for effecting pressure to said fluid, said impeller being motivated by the output from said chamber, an elongated pressure responsive element rockably mounted within the other cylinder and operatively connected to said metering valve.

5. A proportioning apparatus for use in obtaining a proper fuel and air mixture for various operating conditions of an internal combustion engine the latter having an air intake conduit, a flow valve mounted within said conduit, and a mixing chamber connected to said conduit, a pressure equalizing fuel reservoir, a fuel conduit leading from said reservoir to said chamber, an adjustable metering valve disposed within said fuel conduit intermediate said chamber and reservoir, and an operative connection between said flow and metering valves, the initial setting of said metering valve being dependent upon the setting of said flow valve, said apparatus comprising a pair of interconnected hollow members filled with a common liquid, an elongated impeller rotatably mounted within one of said members for effecting circulation of said liquid between said members, said impeller being operatively connected to said engine and responsive to the speed thereof, and an elongated element rockably mounted within said other member and operatively connected to said metering valve, said element being actuated by the circulation of said liquid.

6. A proportioning apparatus for use in obtaining a combustible mixture having the proper air-to-fuel ratio for various operating conditions of an internal combustion engine, said apparatus comprising a pressure equalizing fuel preheating reservoir, a fuel conduit communicating with said reservoir, an adjustable metering valve mounted within said fuel conduit and operatively connected to the air intake control valve for said engine whereby the initial setting of said metering valve is dependent upon the setting of said air intake control valve, and a compensating control unit operatively connected to said metering valve for adjusting independently the initial setting thereof, said unit being operatively connected to said engine and responsive to the speed thereof, said speed being determined by the setting of said air intake flow valve.

7. A fuel proportioning apparatus for use with an internal combustion engine the latter having an air intake tube and an air intake control valve associated with said tube to obtain a desired combustible mixture for various operating conditions of the engine, a fuel imput conduit communicating with said air intake tube, and a fuel metering valve mounted within said conduit and operatively connected to said air intake control valve whereby the initial setting of said metering valve is dependent upon the setting of said control valve, said apparatus comprising a pair of hollow interconnected cylinders mounted on said engine and filled with a common liquid, one of said cylinders provided with a fixed, longitudinal, radially extending baffle, and an elongated shaft rockably mounted within said baffled cylinder and operatively connected to said metering valve, said shaft having a longitudinally extending vane mounted thereon, an elongated impeller rotatably mounted within the other of said cylinders and actuated by the output of said engine for effecting circulation of said liquid, the movement of said shaft being effected by said circulating liquid.

8. A fuel proportioning apparatus for use with an internal combustion engine having an air intake tube and an air intake control valve associated with said tube to obtain a desired combustible mixture for various operating conditions of the engine, said apparatus comprising a pressure equalizing fuel preheating reservoir, a fuel imput conduit communicating with said reservoir and said air intake tube, an adjustable metering valve mounted within said conduit intermediate said reservoir and tube, said metering valve being provided with a slotted control arm, a link operatively connecting said air intake control valve and said slotted arm, the initial setting of said arm being determined by the setting of said control valve, and a compensating unit operatively connected to said engine and said control arm for effecting independent adjustment of said arm subsequent to the initial setting thereof; said unit comprising a pair of interconnected hollow cylinders filled with a common liquid, an impeller rotatably mounted within one of said cylinders for effecting circulating of said liquid between said cylinders, said impeller having one end thereof exposed and operatively connected to said engine and responsive to the speed thereof, a shaft rockably mounted within the other cylinder and having one end thereof exposed, a lever having an arcuated slot formed therein keyed to the exposed end of said shaft, said lever being in cooperative engagement with said link and arm, the movement of said shaft being effected by the circulating liquid.

9. A fuel proportioning apparatus for use with an internal combustion engine having an air intake tube and an air intake control valve associated with said tube to obtain a desired combustible mixture for various operating conditions of the engine, said apparatus comprising a housing mountable on said engine and having a passage formed therein, a pressure equalizing fuel reservoir mounted on said housing, a conduit extending from said reservoir to one end of said passage, a check valve disposed within said conduit, a second conduit extending from the other end of said passage and terminating substantially centrally within said air intake tube, metering valve mounted within said passage and having a portion thereof protruding from said housing, said protruding portion being operatively connected to said air intake control valve, the initial setting of said metering valve being dependent upon the setting of said control valve, a discharge nozzle secured to the terminating end of said second conduit, said nozzle having a pair of relatively flat deflectors arranged in close superimposed relation and transverse to the flow of said air in said tube, one of said deflectors embracing the terminating end of said second conduit, and a compensating unit mounted within said housing and in operative engagement with said metering valve and responsive to the speed of said engine for adjusting the initial setting of said metering valve while the setting of said control valve remains relatively fixed; said unit comprising a pair of interconnected hollow cylinders filled with a common liquid, an impeller rotatably mounted within one of said cylinders for effecting circulation of said liquid between said cylinders, said impeller being operatively connected to said engine to respond to the speed thereof, a vaned shaft rockably mounted within the other of said cylinders and being responsive to the movement of said circulating liquid, one end of said vaned shaft being operatively connected to said metering valve.

LORNTZ H. THORESEN.
HENRY L. THORESEN.

References Cited in the file of this patent

UNITED STATES PATENTS

| Number | Name | Date |
|---|---|---|
| 1,888,248 | Steinhardt | Nov. 22, 1932 |
| 2,131,950 | High | Oct. 4, 1938 |
| 2,430,806 | De Marco | Nov. 11, 1947 |
| 2,445,321 | Fox | July 20, 1948 |
| 2,488,829 | Ramsay | Nov. 22, 1949 |

FOREIGN PATENTS

| Number | Country | Date |
|---|---|---|
| 869,372 | France | Nov. 7, 1941 |